US012742938B2

(12) United States Patent
Aguilar et al.

(10) Patent No.: US 12,742,938 B2
(45) Date of Patent: Sep. 22, 2026

(54) FIBER ALIGNMENT SYSTEM

(71) Applicant: CORNING INCORPORATED, Corning, NY (US)

(72) Inventors: Alejandro Aguilar, Painted Post, NY (US); Jinxin Huang, Santa Clara, CA (US)

(73) Assignee: Corning Incorporated, Corning, NY (US)

( * ) Notice: Subject to any disclaimer, the term of this patent is extended or adjusted under 35 U.S.C. 154(b) by 301 days.

(21) Appl. No.: 18/130,957

(22) Filed: Apr. 5, 2023

(65) Prior Publication Data

US 2023/0333331 A1 Oct. 19, 2023

Related U.S. Application Data

(60) Provisional application No. 63/330,849, filed on Apr. 14, 2022.

(51) Int. Cl.
*G02B 6/42* (2006.01)

(52) U.S. Cl.
CPC .......... *G02B 6/4214* (2013.01); *G02B 6/423* (2013.01); *G02B 6/425* (2013.01)

(58) Field of Classification Search
CPC .... G02B 6/366; G02B 6/4221; G02B 6/4222; G02B 6/4225; G02B 6/4226; G02B 6/4214; G02B 6/423; G02B 6/425
See application file for complete search history.

(56) References Cited

U.S. PATENT DOCUMENTS 3,800,388 A * 4/1974 Borner ................. G02B 6/3803 356/73.1
5,149,350 A 9/1992 Itoh et al.
5,768,458 A * 6/1998 Ro ........................... G02B 6/32 385/74
6,456,369 B1 9/2002 Ohki et al.
(Continued)

FOREIGN PATENT DOCUMENTS

JP 2005-031439 A 2/2005
WO 2022/125443 A1 6/2022

OTHER PUBLICATIONS

Azendorf, F., et al., "Characterization of multi-core fiber group delay with correlation OTDR and modulation phase shift methods", In Optical Fiber Communication Conference (pp. M2C-5). Optical Society of America, 2020, pp. 1-3.
(Continued)

*Primary Examiner* — Rhonda S Peace
(74) *Attorney, Agent, or Firm* — Kevin L. Bray

(57) ABSTRACT

An optical fiber alignment system is disclosed. The alignment system includes a reflective mirror, an image capturing system, and a data processing system. The reflective mirror is configured to simultaneously reflect a first illuminated image of a first optical fiber and a second illuminated image of a second optical fiber. The image capturing system is configured to receive the reflected first and second illuminated images and to convert the first and second illuminated images into computer-readable image data. The data processing system is configured to receive the image data from the image capturing system and to control movement of at least one of the first optical fiber and the second optical fiber based upon the image data.

17 Claims, 5 Drawing Sheets

(56) References Cited

U.S. PATENT DOCUMENTS

| | | | | |
|---|---|---|---|---|
| 6,997,368 | B2 * | 2/2006 | Beatson | B23K 20/007 228/103 |
| 10,620,372 | B2 * | 4/2020 | Matsui | G01B 11/27 |
| 11,086,085 | B2 * | 8/2021 | Morishima | G02B 6/30 |
| 11,762,148 | B2 * | 9/2023 | Zheng | B29D 11/00663 385/97 |
| 11,960,120 | B2 * | 4/2024 | Ohzeki | G02B 6/02042 |
| 2005/0041939 | A1 | 2/2005 | Saito et al. | |
| 2012/0328252 | A1 | 12/2012 | Howell | |
| 2013/0058661 | A1 * | 3/2013 | Greiss | G02B 6/4249 385/52 |
| 2014/0294350 | A1 | 10/2014 | Bradley et al. | |
| 2023/0333331 | A1 * | 10/2023 | Aguilar | G02B 6/2555 |

OTHER PUBLICATIONS

International Search Report and Written Opinion of the International Searching Authority; PCT/US2023/016809; dated Jun. 30, 2023; 14 pages; European Patent Office.

Shen, L., et al., "End-view image processing based angle alignment techniques for specialty optical fibers", IEEE Photonics Journal, vol. 9, No. 2, 2017, pp. 1-8.

Watanabe, K., et al., "Study of fusion splice for single-mode multicore fiber", In 17th Microopics Conference (MOC), 2011, pp. 1-2.

Wenxin Zheng, "Automated alignment and splicing for multicore fibers", Optical Fiber Communication Conference and Exposition and the National Fiber Optic Engineers Conference (OFC/NFOEC), 2013, IEEE, Mar. 17, 2013, 5 pages.

* cited by examiner

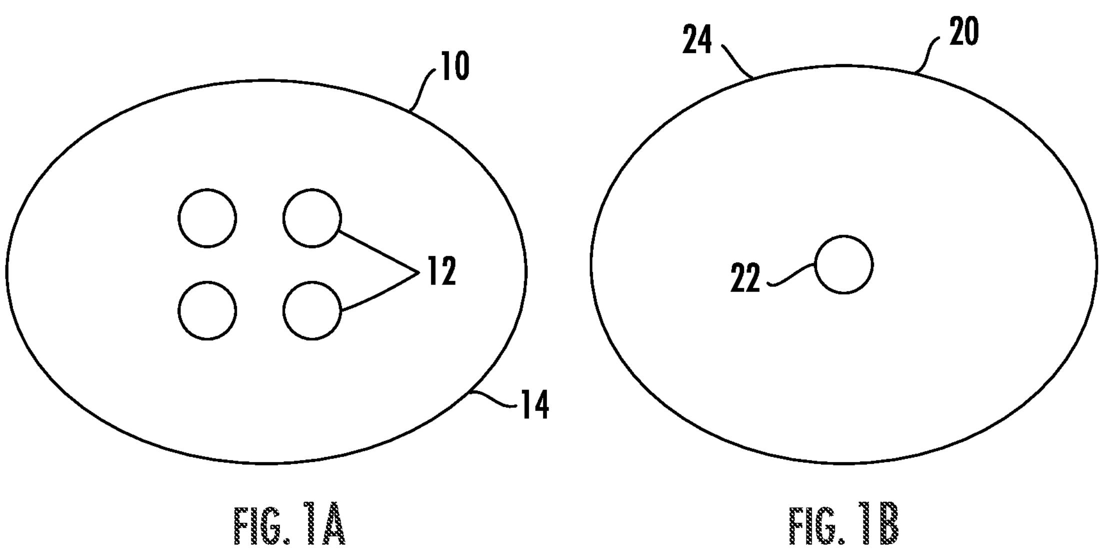
FIG. 1A
FIG. 1B
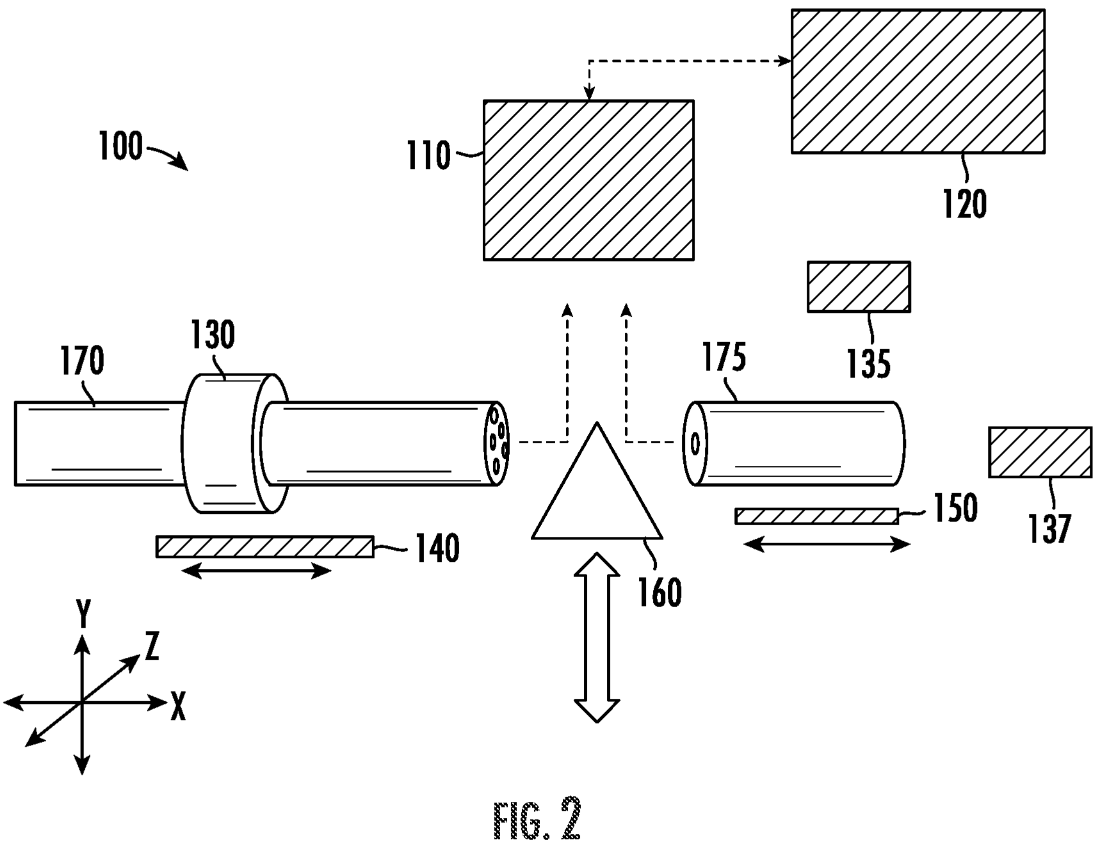
FIG. 2

FIBER ALIGNMENT SYSTEM

This application claims the benefit of priority to U.S. Provisional Patent Application Ser. No. 63/330,849 filed on Apr. 14, 2022, the content of which is relied upon and incorporated herein by reference in its entirety.

FIELD

The present disclosure relates to optical fibers and, more specifically, to an alignment system for single-core and multi-core optical fibers.

BACKGROUND

A standard single-core optical fiber includes a cladding that surrounds an inner core. Such single-core optical fibers are often used for long distance transmissions due to their fast transmission speeds. A multi-core optical fiber includes a plurality of cores all surrounded by the same common cladding. Thus, each core in a multi-core optical fiber can act as a separate waveguide so that light independently propagates through each core. Multi-core optical fibers increase the cable density and, thus, can reduce manufacturing costs compared to single-core optical fibers.

In fiber optic telecommunication systems, there is a growing trend towards expanding the transmission capabilities as data traffic continues to grow. Thus, there is a need in maximizing the transmission capacity per fiber. One approach is to use more multi-core fibers. Connections between previously installed single-core fibers and newly installed multi-core fibers is required in order to provide such increased capacity. However, the single-core and multi-core fibers must be properly aligned in order provide such a connection with, for example, low attenuation in the coupled fibers.

SUMMARY

Embodiments of the present disclosure provide systems and methods to couple single-core and multi-core optical fibers. More specifically, embodiments of the present disclosure provide an alignment system for coupling a single-core optical fiber with a multi-core optical fiber in order to perform one or more measurements on the coupled fibers. For example, the alignment system may couple the fibers together in order to measure the attenuation or point defect of the coupled fibers. The alignment system precisely couples the fibers together in order to easily and accurately obtain the desired measurements on the coupled fibers. The alignment system be an image guided system that quickly and efficiently aligns the core of the single-core optical fiber with a selected core of the multi-core optical fiber.

According to a first aspect an optical fiber alignment system is disclosed. The alignment system comprises a reflective mirror, an image capturing system, and a data processing system. The reflective mirror is configured to simultaneously reflect a first illuminated image of a first optical fiber and a second illuminated image of a second optical fiber. The image capturing system is configured to receive the reflected first and second illuminated images and to convert the first and second illuminated images into computer-readable image data. The data processing system is configured to receive the image data from the image capturing system and to control movement of at least one of the first optical fiber and the second optical fiber based upon the image data.

According to another aspect a method of aligning optical fibers is disclosed. The method comprises illuminating a first optical fiber and a second optical fiber, simultaneously reflecting illuminated images of the first and second optical fibers with a reflective mirror onto an image capturing system, converting the reflected images to computer-readable image data with the image capturing system, processing the image data with a data processing system to determine an alignment error of the first and second optical fibers, and based upon the alignment error, moving the first optical fiber relative to the second optical fiber.

According to another aspect a method of aligning optical fibers is disclosed. The method comprises illuminating a first optical fiber and a second optical fiber, simultaneously reflecting illuminated images of the first and second optical fibers with a reflective mirror onto an image capturing system, converting the reflected images to computer-readable image data with the image capturing system, processing the image data with a data processing system, and based upon the processed image data, moving a first optical fiber relative to a second optical fiber to align a core of the first optical fiber with a core of the second optical fiber. The method further comprises moving the reflective mirror from a first position to a second position and, after moving the reflective mirror to the second position, moving the first optical fibers towards the second optical fiber to couple the core of the first optical fiber with the core of the second optical fiber.

Additional features and advantages are set forth in the detailed description that follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures.

FIG. 1A is a schematic drawing of an exemplary multi-core optical fiber, according to embodiments disclosed herein;

FIG. 1B is a schematic drawing of an exemplary single-core optical fiber, according to embodiments disclosed herein;

FIG. 2 is a schematic drawing of an exemplary alignment system, according to embodiments disclosed herein;

DETAILED DESCRIPTION

Figure 3:
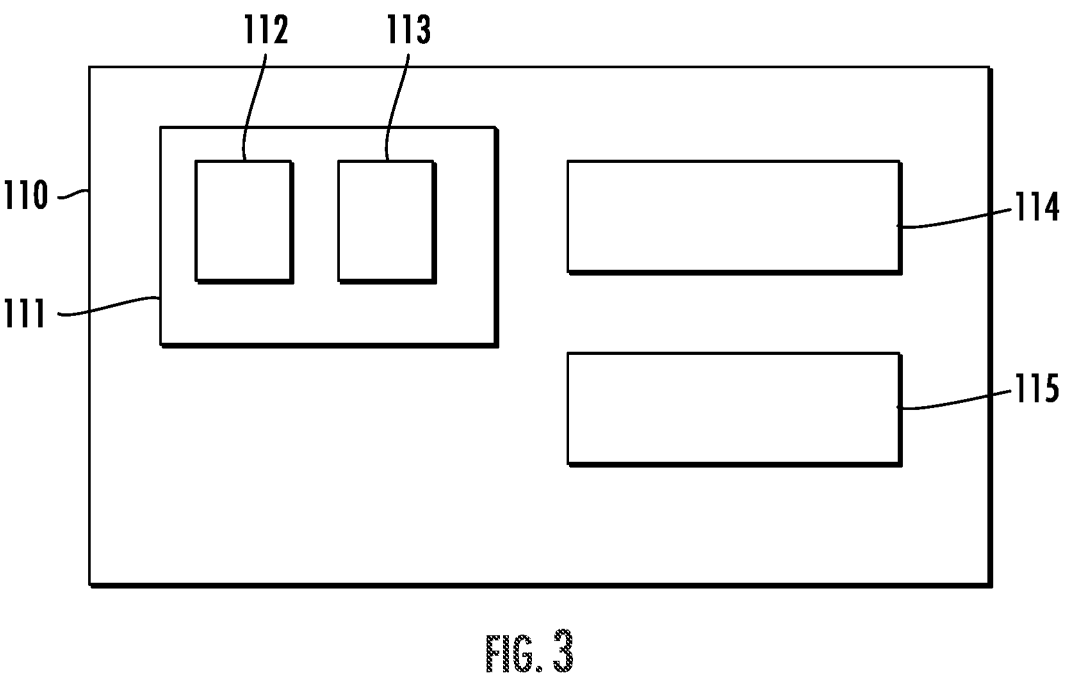
FIG. 3 is a schematic drawing of an exemplary image capturing system of the alignment system of FIG. 2, according to embodiments disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Any relative terms like top, bottom, side, horizontal, vertical, etc., are used for convenience and ease of explanation and are not intended to be limiting as to direction or orientation.

The limits on any ranges cited herein are considered to be inclusive and thus to lie within the range, unless otherwise specified.

"Optical fiber" refers to a waveguide having a glass portion surrounded by a coating. The glass portion includes a core and a cladding, and is referred to herein as a "glass fiber".

"Radial position", "radius", or the radial coordinate "r" refers to radial position relative to the centerline (r=0) of the fiber.

The term "attenuation," as used herein, is the loss of optical power as the signal travels along the optical fiber. Attenuation is measured as specified by the IEC-60793-1-40 standard, "Attenuation measurement methods."

FIG. 1A shows an exemplary multi-core fiber 10 with four cores 12 arranged in a 2×2 square pattern. A common cladding 14 surrounds the four cores. Multi-core fiber 10 has an outer diameter of about 125 microns. Each core 12 has a diameter of about 10 microns. FIG. 1B shows an exemplary single-core fiber 20 that also has an outer diameter of about 125 microns. An outer cladding 24 surrounds the inner core 22 of single-core fiber 20. Inner core 22 has a diameter of about 10 microns, similar to cores 12 of multi-core fiber 10. It is also noted that multi-core fiber 10 and single-core fiber 20 can include other refractive index profiles, such as an inner cladding, one or more depressed-index cladding regions, and/or an outer cladding.

Embodiments of the present disclosure provide systems and methods to align a core of a multi-core optical fiber with a core of a single-core optical fiber, such as the cores of multi-core fiber 10 and single core fiber 20. It is noted that fibers 10, 20 are shown for exemplary purposes and that the systems and methods disclosed herein can be used with other fibers with different configurations, sizes, and profiles. The systems and methods disclosed herein precisely and accurately align the cores in order to measure one or more properties of the coupled fibers, such as, for example, point defect, attenuation, length of the fiber(s), Rayleigh scattering, chromatic dispersion, etc. Due to the precise and accurate alignment (using the systems and methods disclosed herein), the fiber properties can be accurately measured by one or more measurement devices used in conjunction with the alignment device disclosed herein.

As shown in FIG. 2, alignment system 100 comprises an image capturing system 110, a multi-core fiber illumination system 130, a single-core fiber illumination system 135, a multi-core fiber motion stage 140, a single-core fiber motion stage 150, and a reflective mirror 160. A multi-core fiber 170 may be coupled to multi-core fiber motion stage 140 and a single-core fiber 175 may be coupled to single-core fiber motion stage 150. Additionally, alignment system 100 may be coupled to a measurement device 137. Alignment system 100, as also discussed further below, precisely and accurately aligns a core of multi-core fiber 170 with the core of single-core fiber 175. In order to precisely and accurately align the cores, illumination systems 130, 135 simultaneously illuminate the respective fibers so that the illumination is reflected by reflective mirror 160 onto image capturing system 110. Thus, imaging capturing system 110 receives multi-core and single-core illumination data and is able to capture the illumination data and send the data to a data processing system 120 for further processing to align the cores. Once the cores are aligned, measurement device 137 may measure one or more properties of the coupled fibers.

Multi-core fiber 170 may have the configuration disclosed above in FIG. 1A. Single-core fiber 175 may have the configuration disclosed above in FIG. 1B. However, it is noted that alignment system 100 may be used with fibers having different profiles and configurations than those shown in FIGS. 1A and 1B.

Image capturing system 110, as shown in FIG. 3, comprises an imaging optical system that includes a camera 111 with one or more lenses. In some embodiments, camera 111 of image capturing system 110 comprises at least a focus lens 112 to adjust the focal length of the camera, so as to focus the image being captured by camera 111. As discussed further below, the image being captured by camera may be the illuminated cores of an optical fiber. Camera 111 may further comprise a zoom lens 113 to adjust the zoom (e.g., magnification) of the image being captured. Image capturing system 110 may also comprise an image sensor 114 to convert the image being captured into a signal and to transmit that signal to data processing system 120. Thus, image sensor 114 may comprise a communication device to communicate with data processing system 120.

In some embodiments, image sensor 114 may convert the image captured by camera 111 into computer-readable image data. The image data may include coordinate information of the cores captured by camera 111. The image data is transmitted to data processing system 120 via image sensor 114. Furthermore, image sensor 114 may process the image data by, for example, filtering the data, analyzing the data, segmenting the data, or the like. Additionally, the image data may be stored in storage unit 115 of image capturing system 110.

Image capturing system 110 may also comprise memory (such as in storage unit 115) to store program instructions and one or more processors (such as image sensor 114) to execute the instructions. Thus, image capturing system 110 may comprise one or more non-transitory processor-readable memories configured for storing processor-executable code.

Figure 4:
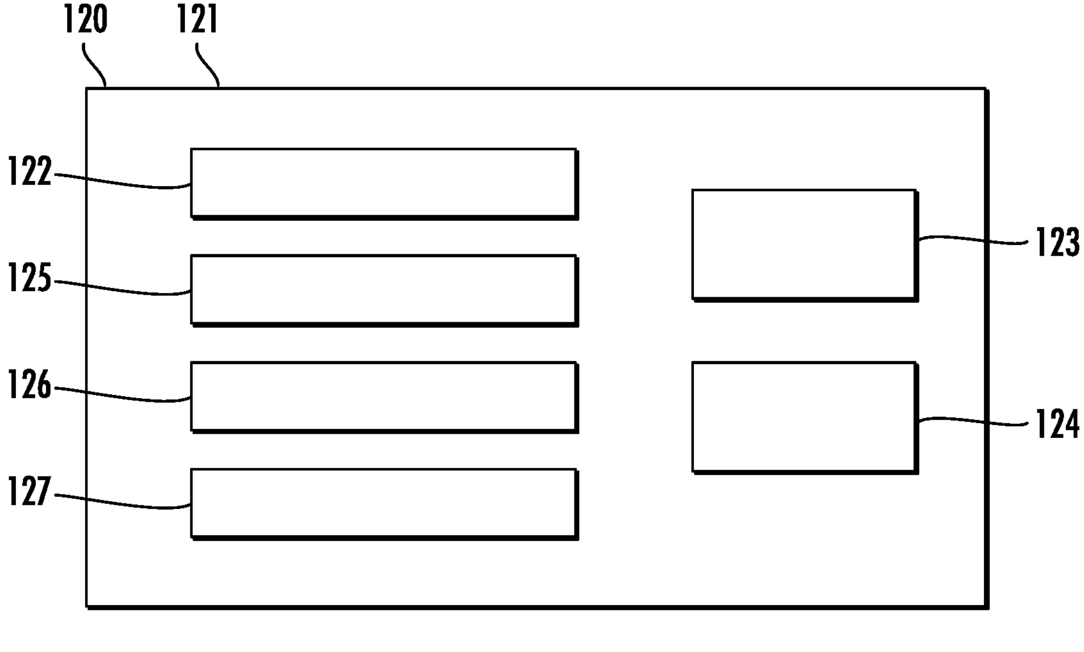
FIG. 4 is a schematic drawing of an exemplary data processing system of the alignment system of FIG. 2, according to embodiments disclosed herein.

Data processing system 120 communicates with image capturing system 110 to align the cores of a multi-core and a single-core optical fiber. Thus data processing system 120 causes the cores of the multi-core and single-core optical fibers to be aligned based upon the image data received from image capturing system 110. As shown in FIG. 4, data processing system 120 may comprise an image processing controller 121 that includes a central processing unit (CPU) 122, a primary storage device 123, a secondary storage device 124, a communication device 125, a display unit 126, and an operation unit 127. CPU 122 performs overall control of data processing system 120. Primary storage 123 may store one or more programs for operating CPU 122 to, for example, convert the signal from image capturing system 110 into a viewable image. Secondary storage device 124 may be constituted by a RAM and the like and store a program read from secondary storage device 123. Communication device 125 communicates with image capturing system 110 to receive the signal (e.g., image data) transmitted from image capturing system 110. Display unit 126 displays the image captured by camera 111 of image capturing system 110. In some embodiments, display unit 126 is a monitor or screen.

CPU 122 is configured to execute processor-executable code to align the cores of multi-core fiber 170 and single-core fiber 175 based upon the signal received from image capturing system 110. For example, CPU 122 may receive the image data from image capturing system 110, and based upon the received image data, CPU 122 may determine that the core of single-core fiber 175 is offset from the selected core of multi-core fiber 170. CPU 122 may then instruct and cause the position of at least one of multi-core fiber 170 and single-core fiber 175 to be adjusted to properly align the cores (so that their coordinates are not offset from each other). In some embodiments, the position of single-core fiber 175 is adjusted relative to multi-core fiber 170. For example, in one exemplary embodiment, CPU 122 may cause single-core fiber motion stage 150 to move single-core fiber 175 in an upward direction to align the cores. In other embodiments, CPU 122 may determine that the cores of multi-core fiber 170 and single-core fiber 175 are aligned based upon the image data received from image capturing system 110. In these embodiments, the positions of the fibers need not be adjusted to align the cores.

CPU 122 is also configured to execute processor-executable code to cause the fibers, once it is determined that they are aligned, to move closer together to become coupled with each other. Thus, once CPU 122 determines that the coordinates of the selected core of multi-core fiber 170 are properly aligned with the coordinates of the core of single-core fiber 175, CPU 122 may cause the fibers to move together. Thus, CPU 122 may instruct and cause at least one of multi-core fiber motion stage 140 and single-core fiber motion stage 150 to move the optical fibers towards each other (as discussed further below). It is further noted that when coupled together, multi-core fiber 170 and single-core fiber 175 may or may not contact. In some embodiments, a gap is present between the end-faces of the coupled fibers. The gap may be less than about 100 microns, or less than about 50 microns, or less than about 25 microns, or less than about 10 microns, or less than about 5 microns, or less than about 2 microns, or less than about 1 micron.

CPU 122 may automatically cause at least one of multi-core fiber motion stage 140 and single-core fiber motion stage 150 to move the optical fibers. Additionally or alternatively to movement of the fibers by CPU 122, operation unit 127 may allow a user to manually move and adjust the position of the fibers. In these embodiments, operation unit 127 accepts a user input and based upon the input, at least one of the fibers moves correspondingly.

In some embodiments, controller 121 also calculates an alignment error of the core of multi-core fiber 170 with the core of single-core fiber 175. The alignment error may represent an amount of overlap in the coordinates between the cores or the distance between the coordinates of the cores. Display unit 126 of data processing system 120 may provide a readout of the alignment error. For example, controller 121 may determine that the coordinates of the selected core of multi-core fiber 170 are offset from the core of single-core fiber 175 by a distance of about 1 micron in a Y-axis direction. Based upon this alignment error, for example, controller 121 may then instruct and cause the position of single-core fiber 175 to be adjusted to better align the cores (as discussed above). After the position adjustment of single-core fiber 175, controller 121 may then calculate a new alignment error of the cores. It is also noted that in other embodiments, the alignment error may be an offset in, for example, a Z-axis direction, or a combination of Y-axis and Z-axis directions.

The alignment error may be calculated using the coordinates of the selected core of multi-core fiber 170 and the core of single-core fiber 175. For example, in some embodiments, the alignment error may be the amount or percent overlap of the coordinates. Additionally or alternatively, the alignment error may be the distance between the coordinates. The coordinates of the cores may be calculated and/or determined from the pixels of each core in the image captured by image capturing system 110. Thus, in some embodiments, the image data transmitted to data processing system 120 by image capturing system 110 may include pixel information (including number and location of the pixels) of each core. As discussed further below, the alignment error may be compared to a predetermined threshold to determine the alignment of the cores.

It is also noted that, in some embodiments, one or more of the components or sub-units of controller 121 disclosed herein (such as components 122-127) may comprise a separate device that is independent of controller 121 but in communication with controller 121. It is also contemplated that image capturing system 110 and data processing system 120 may be the same element rather than separate and distinct elements as shown in FIGS. 2-4.

Referring again to FIG. 2, multi-core fiber illumination system 130 may comprise one or more light sources configured to be disposed around multi-core fiber 170 (when the fiber is positioned in system 100). In some embodiments, system 130 forms a ring-shape with an inner diameter sufficient to receive a multi-core fiber. The light sources of system 130 may be configured to direct illumination radiation to the multi-core fiber disposed in system 100. The illumination radiation is directed from a position outward of multi-core fiber 170 such that the illumination radiation penetrates within multi-core optical fiber 170 in a radially inward direction (from the outer surface of the fiber radially inwards towards its cores). The illumination radiation may be sufficient to illuminate the cladding and/or each core of multi-core fiber 170. In embodiments, the light sources of system 130 comprise electro-luminescent elements such as, for example, light-emitting diodes (LED) lamps, laser diodes, or other infrared (IR) lamps. In some embodiments, the light sources are LED lamps that emit light having a wavelength between about 400 nm to about 700 nm.

As shown in FIG. 2, system 130 may form a ring that completely surrounds multi-core fiber 170. However, it is also contemplated that system 130 only partially surrounds multi-core fiber 170 such that it surrounds less than an entirety of the fiber. Furthermore, it is also contemplated that system 130 comprises other shapes than depicted in FIG. 2.

For example, system 130 may comprise a square shape that completely (or only partially) surrounds multi-core fiber 170.

Single-core fiber illumination system 135 is a light source configured to illuminate single-core fiber 175 (when the fiber is positioned in system 100). In some embodiments, system 135 comprises an LED, such as a white light LED. The illumination of system 135 is directed from a position outward of single-core fiber 175 such that the illumination light penetrates within single-core optical fiber 175 in a radially inward direction (from the outer surface of the fiber radially inwards towards its core). The illumination light may be sufficient to illuminate the cladding and/or core of single-core fiber 175.

Measurement device 137 may measure one or more fiber properties of the coupled multi-core fiber 170 and single-core fiber 175. For example, measurement device 137 may measure one or more of point defect, attenuation, length of the fiber(s), Rayleigh scattering, and chromatic dispersion. Measurement device 137 may be a separate component that is distinct from alignment system 100. In these embodiments, measurement device 137 may be coupled to alignment device 100. In other embodiments, measurement device 137 may a component of and part of alignment system 100. In some examples, measurement device 137 is an optical time-domain reflectometer (OTDR).

Measurement device 137 may be coupled and/or connected to single-core fiber 175. Thus, measurement device 137 may measure the one or more fiber properties of the coupled fibers through its coupling/connection to single-core fiber 175. In some embodiments, measurement device 137 may illuminate single-core fiber 137 in order to measure the one or more fiber properties. Measurement device 137 may comprise a super-luminescent diode, a laser source configured to emit light at a select wavelength, a tunable laser, or a laser such as a distributed feedback laser with a fixed wavelength, or the like. For example, measurement device 137 may comprise a narrow linewidth light source (e.g., around 0.05 nm or less). Measurement device 137 may be configured to provide polarized light that is modulated. In other embodiments, measurement device 137 may comprise a vertical cavity surface emitting lasers (VCSEL) that is directly modulated.

Data processing system 120 may be in communication with measurement device 137 to align the fibers for measurement purposes. It is also contemplated that data processing system 120 is in communication with measurement device 137 to obtain the fiber property measurements once the fibers are aligned. In some embodiments, data processing system 120 is electrically connected to multi-core fiber illumination system 130 and/or single-core fiber illumination system 135 to control the operation of the light sources and the illumination of multi-core fiber 170 and/or single-core fiber 175.

Illumination systems 130, 135 illuminate the cores and/or cladding of multi-core fiber 170 and single-core fiber 175, respectively. A cross-sectional image of the illuminated fibers is captured by camera 111 of image capturing system 110, as discussed above. Advantageously, camera 111 is able to capture the images of both multi-core and single-core fibers 170, 175 simultaneously with reflective mirror 160. More specifically, reflective mirror 160 reflects the illuminated cores/cladding of multi-core fiber 170 to image capturing system 110 simultaneously as it reflects the illuminated core/cladding of single-core fiber 175 to image capturing system 110. Such allows image capturing system 110 to capture the two images at the same time and on the same coordinate system (as discussed further below). In embodiments disclosed herein, alignment system 100 only comprises one single camera (camera 111).

Figure 5:
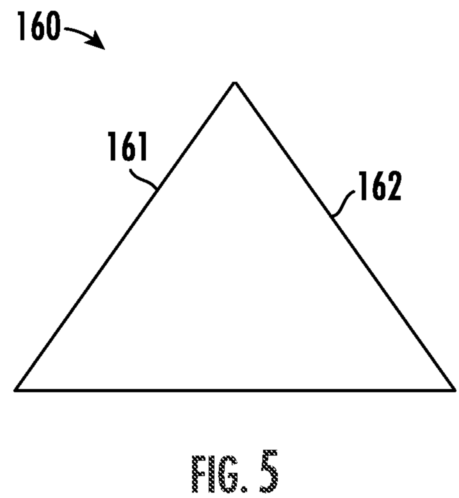
FIG. 5 is a schematic drawing of an exemplary reflective mirror of the alignment system of FIG. 2, according to embodiments disclosed herein.

Reflective mirror 160 comprises one or more reflective surfaces to reflect the images from multi-core fiber 170 and from single-core fiber 175 to image capturing system 110. As shown in FIG. 5, reflective mirror 160, in some embodiments, comprises a first reflecting surface 161 and a second reflecting surface 162. First reflecting surface 161 may be configured to reflect the image from multi-core fiber 170 to image capturing system 110. Second reflecting surface 162 may be configured to reflect the image from single-core fiber 175 to image capturing system 110. Furthermore, first and second reflecting surfaces 161, 162 may be configured to simultaneously reflect the images to image processing system 110. Therefore, image processing system 110 is able to receive the image from multi-core fiber 170 at the same time that it receives the image data from single-core fiber 175.

Because image capturing system 110 receives the images simultaneously, image capturing system 110 is able to capture the images using just a single camera. Therefore, the images are provided to image capturing system 110 on the same reference plane with the single camera. Stated another way, the single camera captures both images with the same magnification, focal length, depth of field, etc. Therefore, the images are on the same coordinate system and the position of the cores can be easily compared. The image data of multi-core fiber 170 may be easily compared to the image data of single-core fiber 175 to determine the alignment of the cores. In comparison, traditional systems utilize two image systems: a first image system with a first camera and a second image system with a second camera. The first camera captures an image of a multi-core fiber, and the second camera captures an image of a single-core fiber. Therefore, in the traditional systems, the fiber images are captured by two different cameras so that the images are not captured on the same coordinate system. For example, the different placement alone of the two cameras may provide images on different coordinate systems. It is noted that even by setting the two cameras to the same settings, even inherent differences in the cameras themselves produce images on different coordinate systems.

Although the embodiment of FIG. 5 only shows two reflective surfaces 161, 162, it is also contemplated that reflective mirror 160 may comprise more reflective surfaces. The slope and orientation of each reflective surface may be adjusted to reflect the image from the optical fiber onto image capturing system 100. In some embodiments, reflective mirror 160 comprises a triangular cross-sectional shape, as shown in FIG. 5. However, it is also contemplated that reflective mirror 160 may comprise other shapes, such as a hexagonal cross-sectional shape. In some exemplary embodiments, reflective mirror 160 is a knife-edge mirror.

The reflecting surfaces of reflective mirror 160 may comprise a reflecting material suitable to reflect the images to image capturing system 110. In some embodiments, the reflective material comprises, for example, aluminum, sapphire, gold, silver, chrome, copper, nickel, titanium, or combinations thereof.

In some embodiments, the reflective material of reflective mirror 160 comprises a metal such as, for example, Al, Au, Ag, or Cr. In other embodiments, the reflective material comprises Si (amorphous or polycrystalline) or CrON. It is also contemplated that the reflective material comprises a combination of one or more of these materials. In some embodiments, the reflective material comprises dielectric layers of alternating layers of low and high refractive index materials. The materials with the low refractive index may have a refractive index in the range of about 1.35 to about 1.5 and may comprise, for example, $MgF_2$, $BaF_2$, and $SiO_2$. The materials with the high refractive index may have a refractive index of about 1.9 to about 3.8 and may comprise, for example, SiN ($Si_3N_4$), SiAlON, Si, $Ta_2O_5$, $Ta_2O_2$, $TiO_2$, $Pr_2O_3$, $Nb_2O_3$, $HfO_2$, $Al_2O_3$, $Nb_2O_5$, $ZrO_2$, and $Y_2O_3$.

The reflective material may be a coating disposed on an outer surface(s) of reflective mirror 160. In these embodiments, the coating may further include an additional layer of a blocking or absorbing coating to, for example, remove any stray light by absorption. In the embodiments in which the reflective material comprises a coating, the remainder of reflective mirror 160 may be comprised of glass, glass ceramic, ceramic, or metal. Glass materials include, for example, silicate glass, aluminosilicate glass, alkali aluminosilicate glass, alkaline aluminosilicate glass, borosilicate glass, boro-aluminosilicate glass, alkali aluminoborosilicate glass, alkaline aluminoborosilicate glass, soda-lime glass, fused quartz (fused silica), or other types of glass. Exemplary glass materials include, but are not limited to, high purity fused silica HPFS® sold by Corning Incorporated of Corning, New York under glass codes 7980, 7979, and 8655, and EAGLE XG® boro-aluminosilicate glass also sold by Corning Incorporated of Corning, New York. Other glass substrates include, but are not limited to, ultra-low expansion ULE® glass, Lotus™ NXT glass, Iris™ glass, WILLOW® glass, GORILLA® glass, VALOR® glass, Vycor™ glass, or PYREX® glass sold by Corning Incorporated of Corning, New York. In some embodiments, reflective mirror 160 is comprised of float glass, such as soda lime glass. In yet other embodiments, reflective mirror 160 is comprised of silica glass with 80 wt. % or more of silica, or 85 wt. % or more of silica, or 90 wt. % or more of silica, or 95 wt. % or more of silica, or 99 wt. % or more of silica.

Exemplary glass ceramics include, for example, lithium disilicate, nepheline, beta-spodumene, and beta-quartz. Exemplary commercially available materials include, for example, Macor® and Pyroceram® sold by Corning Incorporated of Corning, New York.

Figure 6A:
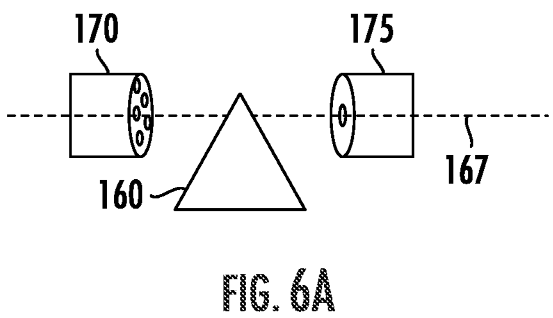
FIGS. 6A and 6B are schematic drawings illustrating first and second positions of the reflective mirror of FIG. 5, according to embodiments disclosed herein.
Figure 6B:
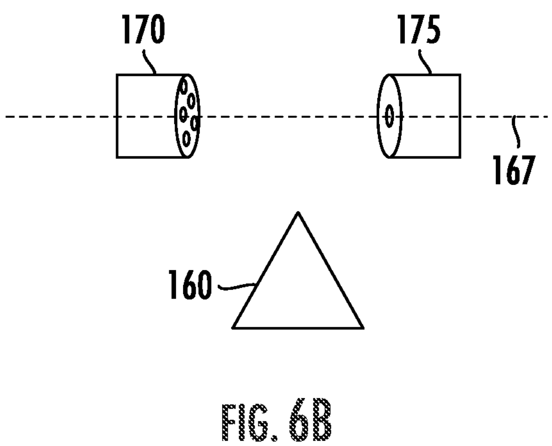

Reflective mirror 160 is configured to move from a first position (as shown in FIG. 6A) to a second position (as shown in FIG. 6B) that is axially adjacent to the first position. In the first position, reflective mirror 160 is able to simultaneously reflect the images from multi-core and single-core fibers 170, 175 to image capturing system 110. When in the first position, reflective mirror 160 may be positioned and disposed between multi-core fiber 170 and single-core fiber 175. More specifically, as shown in FIG. 2, reflective mirror 160, when in the first position, may be disposed along a longitudinal plane 167 that intersects both multi-core fiber 170 and single-core fiber 175, such that multi-core fiber 170 is positioned on a first side of reflective mirror 160 and single-core fiber 175 is positioned on a second side of reflective mirror 160.

In the second position, reflective mirror 160 is no longer disposed along longitudinal plane 167. Instead, reflective mirror 160 is disposed adjacent to and remote from longitudinal plane 167 (e.g., below longitudinal plane 167). Thus, reflective mirror 160 is no longer disposed between multi-core fiber 170 and single-core fiber 175 and, therefore, is no longer able to simultaneously reflect the images to image capturing system 110.

Because reflective mirror 160 is not disposed between the fibers when in the second position, multi-core fiber 170 and single-core fiber 175 are able to be moved closer together to couple these fibers. Multi-core fiber motion stage 140 adjusts the position of multi-core fiber 170 and single-core fiber motion stage 150 adjusts the position of single-core fiber 175 to bring the fibers closer together.

Multi-core fiber motion stage 140 may be configured to move multi-core fiber 170 in six degrees of freedom: toward and away from single-core fiber 175 along an X-axis, up and down relative to single-core fiber 175 along a Y-axis, and forward and backward relative to single-core fiber 175 along a z-axis. Single-core fiber motion stage 150 may also be configured to move single-core fiber 175 in six degrees of freedom: toward and away from multi-core fiber 170 along the X-axis, up and down relative to multi-core fiber 170 along the Y-axis, and forward and backward relative to multi-core fiber 170 along the z-axis. In some embodiments, alignment system 100 only comprises either multi-core fiber motion stage 140 or single-core fiber motion stage 150 so that only one of the fibers moves relative to the other fiber. For example, in some embodiments, only single-core fiber 175 moves relative to multi-core fiber 170.

It is also contemplated that at least one of multi-core fiber motion stage 140 and single-core fiber motion stage 150 is configured to rotate the fiber. For example, in some embodiments, multi-core fiber motion stage 140 is able to rotate multi-core fiber 170 about the X-axis. Such rotation may help to precisely align the cores of multi-core and single-core fibers 170, 175.

The movement of multi-core fiber 170 and/or single-core fiber 175 with stages 140, 150 allows the fibers to be precisely aligned relative to each other. Data processing system 120 may control movement of stages 140, 150. Additionally or alternatively, a user may control movement of stages 140, 150 using, for example, operation unit 127.

Figure 7:
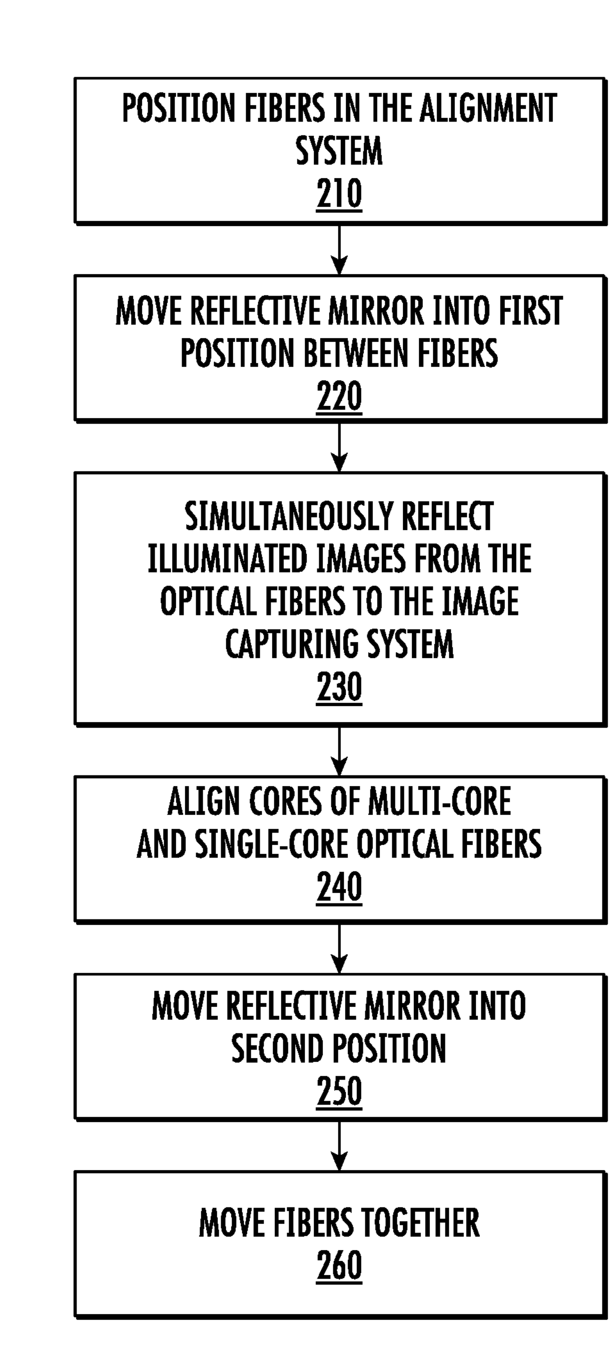
FIG. 7 depicts an exemplary process of aligning and coupling fibers using the alignment system of FIG. 2, according to embodiments disclosed herein.

FIG. 7 depicts a process 200 of using alignment system 100 to precisely align the core of single-core fiber 175 with a selected core of multi-core fiber 170. An exemplary multi-core fiber 170 may have four cores arranged in a 2×2 square pattern. The selected core may, for example, be core number one (which is determined in relation to a marker core, as is known in the art). Thus, in this example, the core of single-core fiber 175 is aligned with core number one of multi-core fiber 170. In step 210 of process 200, the fibers are positioned in alignment system 100. Such comprises disposing multi-core fiber illumination system 130 around multi-core fiber 170 to illuminate the fiber. Such also comprises illuminating single-core optical fiber 175 with single-core fiber illumination system 135. The illuminated optical fibers may be viewable on display unit 126 (as shown, for example, in FIG. 8). In step 210, image capturing system 110 may be adjusted so that the images of the cores are each in focus and at the proper magnification.

Process 200 also comprises moving reflective mirror 160 to the first position so that it is disposed between multi-core fiber 170 and single-core fiber 175 (step 220). It is also contemplated that reflective mirror 160 may already be in this first position when multi-core and single-core fibers 170, 175 are positioned in alignment system 100. In step 230, reflective mirror 160 simultaneously reflects the images from multi-core fiber 170 and from single-core fiber 175 to image capturing system 100. As discussed above, reflective mirror 160 reflects the cross-sectional images of the illuminated fibers. Image capturing system 110 then captures these images (with, for example, camera 111). Image capturing system 110 then further converts the captured images into computer-readable image data (with, for example, image sensor 114).

Image capturing system 110 simultaneously captures the images from multi-core fiber 170 and from single-core fiber 175 so that both images are captured on the same coordinate system with the same magnification, focal length, depth of field, etc. Such allows a user to easily align the fiber cores without further manipulating the data.

In step 240 of process 200, the cores of multi-core fiber 170 and single-core fiber 175 are aligned. Such may first involve transmitting the image data (corresponding to the captured illuminated fiber images) from image capturing system 110 to data processing system 120. Based upon the received image data, data processing system 120 may calculate the alignment error of the cores and may then direct and cause the position of the fibers to be adjusted. Movement of the fibers involves moving and/or rotating the fibers to align the cores using motion stages 140 and/or 150 (as discussed above). For example, multi-core fiber motion stage 140 may rotate multi-core fiber 170 about the X-axis to align core number one of multi-core fiber 170 with the core of single-core fiber 175. As another example, single-core fiber motion stage 150 may move single-core fiber 175 upwards, along the Y-axis, to align the core of single-core fiber 175 with core number one of multi-core fiber 170.

In some embodiments of step 240, data processing system 120 calculates a first alignment error for the cores of multi-core fiber 170 and single-core fiber 175. In one example, the first alignment error may be an insufficient error rate (below a predetermined threshold). Therefore, data processing system 120 may instruct motion stage 140 and/or 150 to move the fiber(s) to better align the fibers. For example, data processing system 120 may instruct motion stage 140 and/or 150 to move at least one of the fibers upwards and/or downwards relative to the other fiber. After movement of the fiber(s), data processing system 120 may calculate a second alignment error. The second alignment error may also be an insufficient error rate (below the predetermined threshold). Therefore, for example, data processing system 120 may instruct motion stage 140 and/or 150 to rotate the fiber(s) to better align the fibers. After rotation of the fiber(s), data processing system 120 may then calculate a third alignment error. In this example, data processing system 120 may determine that the third alignment is sufficient and above the predetermined threshold. Therefore, data processing system 120 may determine that the fibers are now properly aligned and can be coupled together.

It is also contemplated that in some embodiments of step 240, the cores of multi-core and single-core fibers 170, 175 are aligned without any manipulation of these fibers. Thus, in these embodiments, motion stages 140, 150 are not needed to move the fibers to align the cores.

Once the cores of multi-core and single-core fibers 170, 175 are determined to be aligned, reflective mirror 160 is then moved from its first position to its second position (step 250 of process 200). Therefore, reflective mirror 160 is moved so that it is no longer disposed between multi-core fiber 170 and single-core fiber 175. Such allows the fibers to be moved closer together and coupled without reflective mirror 160 blocking them.

In step 260 of process 200, multi-core fiber 170 and/or single-core fiber 175 are moved closer together to couple the fiber cores. For example, in some embodiments, single-core motion stage 150 moves single-core fiber 175 closer to and relative to multi-core fiber 170 to couple the fiber cores. Step 260 may further comprise using data processing system 120 to determine the alignment of the cores after the coupling of the fibers. Therefore, data processing system 120 may perform a system check to verify the alignment of the fibers after they are coupled together. After step 260, measurement device 137 may measure one or more fiber properties in the aligned fibers.

It is also noted that process 200 and the embodiments disclosed herein are not limited to coupling a multi-core core fiber with a single-core fiber. Instead, alignment system 100 and the processes disclosed herein may be used to couple a single-core fiber with another single-core fiber or a multi-core fiber with another multi-core fiber.

Figure 8:
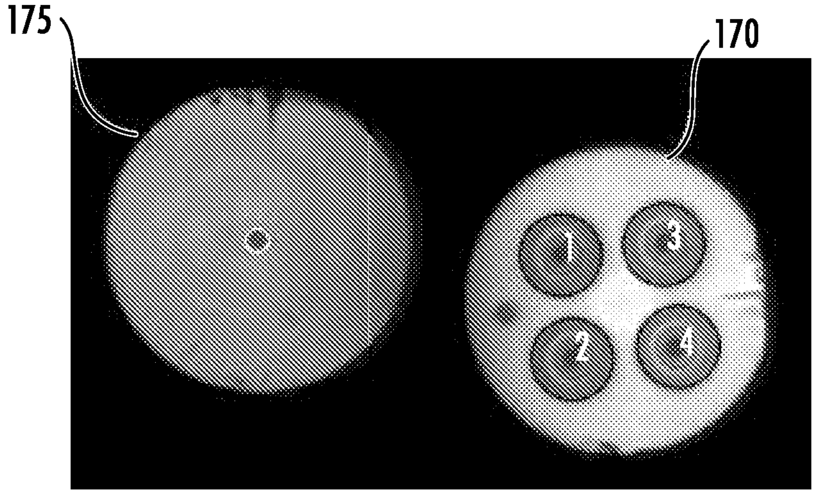
FIG. 8 is an image of an illuminated single-core optical fiber and an illuminated multi-core optical fiber captured by the alignment system of FIG. 2, according to embodiments disclosed herein.

FIG. 8 shows images captured by image capturing system 100 of multi-core fiber 170 and single-core fiber 175 in one exemplary embodiment. The cores of multi-core fiber 170 are numbered in relation to the marker core, as is well known in the art. As discussed above, based upon the images of FIG. 8, data processing system 120 aligns the cores of the optical fibers to couple the fibers together. More specifically, in this exemplary embodiment, data processing system 120 causes motion stages 140 and/or 150 to move at least one of the fibers to couple core number one of multi-core fiber 170 with the core of single-core fiber 175.

Alignment system 100 aligns the cores of multi-core and single-core optical fibers with such precise alignment that the coupled fibers may be accurately measured for one or more fiber properties (point defect, attenuation, length of the fiber(s), Rayleigh scattering, chromatic dispersion, etc.). Without such precise alignment, the fiber property measurements will not be accurately obtained.

Alignment system 100 was tested for its accuracy with repeated use, the results of which are shown in Table 1. In a first set-up, a multi-core fiber and a single-core fiber were positioned in alignment system 100 as discussed above. For test numbers 1-10 (as shown in Table 1 below), the fibers were not removed from alignment system 100 during the testing process. However, the single-core fiber was moved out of alignment with the selected core of the multi-core fiber in between the testing measurements. For each test 1-10, the single-core fiber was aligned with the selected core of the multi-core fiber, the fibers were coupled together, and the attenuation of the coupled fibers was measured using a measurement device. Then, the single-core fiber was moved out of alignment before starting the next test.

In a second set-up of the testing process, the same multi-core fiber and single-core fiber from the first set-up were positioned in alignment system 100. For test numbers 11-20 (as shown in Table 1 below), the single-core fiber was removed from alignment system 100 during the testing process. More specifically, the single-core fiber was removed from alignment system 100 in between the testing measurements. For each test 11-20, the single-core fiber was positioned in alignment system 100, aligned with the selected core of the multi-core fiber, the fibers were coupled together, and the attenuation of the coupled fibers was measured using a measurement device. Then, the single-core fiber was removed from alignment system 100 and repositioned in alignment system 100 before starting the next test.

Test numbers 1-10 of the first set-up were used as a comparison to determine if the second set-up (when completely removing the fiber under test from the system) produced similar coupling results with similar attenuation measurements. As shown in Table 1 below, test numbers 11-20 showed similar coupling results by providing very similar attenuation measurements in the coupled fibers. Table 1 also shows that after 20 tests conducted with the system, the attenuation is substantially unchanged, showing that the system can be used repeatedly.

TABLE 1

| Test Number | Attenuation in Coupled Fibers (dB/km) | Test Number | Attenuation in Coupled Fibers (dB/km) |
|---|---|---|---|
| 1 | 0.182 | 11 | 0.182 |
| 2 | 0.181 | 12 | 0.182 |
| 3 | 0.182 | 13 | 0.185 |
| 4 | 0.182 | 14 | 0.183 |
| 5 | 0.182 | 15 | 0.184 |
| 6 | 0.182 | 16 | 0.182 |
| 7 | 0.182 | 17 | 0.182 |
| 8 | 0.182 | 18 | 0.182 |
| 9 | 0.182 | 19 | 0.183 |
| 10 | 0.181 | 20 | 0.182 |
| Average | 0.182 | Average | 0.183 |
| Standard deviation | 0.0004 | Standard deviation | 0.0010 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber alignment system comprising:

a first illumination system configured to illuminate a first singe-core optical fiber;

a second illumination system comprising one or more light sources configured to at least partially radially surround a second multi-core optical fiber to provide illumination radiation from a position radially outward and directed radially inward of the second multi-core optical fiber towards at least one core of the second multi-core optical fiber to illuminate the second multi-core optical fiber;

a reflective mirror configured to simultaneously reflect a first illuminated image of the first single-core optical fiber and a second illuminated image of the second multi-core optical fiber, the reflective mirror being configured to move from a first position to a second position wherein the reflective mirror is disposed between the first single-core optical fiber and the second multi-core optical fiber in the first position, and the reflective mirror is not disposed between the first single-core optical fiber and the second multi-core optical fiber in the second position;

an image capturing system configured to receive the reflected first and second illuminated images and to convert the first and second illuminated images into computer-readable image data;

a data processing system configured to receive the image data from the image capturing system and to control movement of at least one of the first single-core optical fiber and the second multi-core optical fiber based upon the image data; and a measurement device configured to measure one or more properties of the first singe-core optical fiber and the second multi-core optical fiber when coupled together, the measurement device being connected to the single-core optical fiber to measure the one or more properties.

2. The optical fiber alignment system of claim 1, further comprising a motion stage configured to move the first single-core optical fiber relative to the second multi-core optical fiber.

3. The optical fiber alignment system of claim 2, wherein the motion stage is configured to rotate the first single-core optical fiber relative to the second multi-core optical fiber.

4. The optical fiber alignment system of claim 2, wherein the motion stage is configured to move the first single-core optical fiber relative to the second multi-core optical fiber along an X-axis, Y-axis, and Z-axis.

5. The optical fiber alignment system of claim 1, wherein the reflective mirror comprises a first reflective surface and a second reflective surface.

6. The optical fiber alignment system of claim 5, wherein the first reflective surface is configured to reflect the first illuminated image of the first single-core optical fiber and the second reflective surface is configured to reflect the second illuminated image of the second multi-core optical fiber.

7. The optical fiber alignment system of claim 1, wherein the reflective mirror comprises a triangular shape.

8. The optical fiber alignment system of claim 1, further comprising a display unit configured to display the first illuminated image and the second illuminated image.

9. The optical fiber alignment system of claim 1, wherein the image capturing system comprises a camera configured to capture the first illuminated image and the second illuminated image.

10. The optical fiber alignment system of claim 1, further comprising the first single-core optical fiber disposed in the optical fiber alignment system.

11. The optical fiber alignment system of claim 1, further comprising the second multi-core optical fiber disposed in the optical fiber alignment system.

12. A method of aligning optical fibers, the method comprising:

illuminating a first single-core optical fiber with a first illumination system;

positioning one or more light sources of a second illumination system around a second multi-core optical fiber to illuminate the second multi-core optical fiber so that the one or more light sources at least partially surrounds the second multi-core optical fiber, the one or more light sources providing illumination radiation from a position radially outward and directed radially inward of the second multi-core optical fiber towards at least one core of the second multi-core optical fiber to illuminate the second multi-core optical fiber;

simultaneously reflecting illuminated images of the first single core optical fiber and the second multi-core optical fiber from a reflective mirror and onto an image capturing system;

converting the reflected images to computer-readable image data with the image capturing system;

processing the image data with a data processing system to determine an alignment error of the first single-core optical fiber and the second multi-core optical fiber;

based upon the alignment error, moving the first single-core optical fiber relative to the second multi-core optical fiber;

moving the reflective mirror from a first position to a second position wherein the reflective mirror is disposed between the first single-core optical fiber and the second multi-core optical fiber in the first position, and the reflective mirror is not disposed between the first single-core optical fiber and the second multi-core optical fiber in the second position;

coupling the first single-core optical fiber with the second multi-core optical fiber; and measuring one or more properties of the coupled first single-core optical fiber and the second multi-core optical fiber with a measurement device that is connected to the first single-core optical fiber.

13. The method of claim 12, further comprising, when the reflective mirror is in the second position, moving the first single-core optical fiber towards the second multi-core optical fiber to couple the fibers together.

14. The method of claim 12, wherein moving the first single-core optical fiber relative to the second multi-core optical fiber based upon the alignment error comprises rotating the first single-core optical fiber relative to the second multi-core optical fiber.

15. The method of claim 12, wherein moving the first single-core optical fiber relative to the second multi-core optical fiber based upon the alignment error comprises moving the first single-core optical fiber along at least one of an X-axis, Y-axis, and Z-axis relative to the second multi-core optical fiber.

16. The method of claim 12, further comprising moving the first single-core optical fiber relative to the second multi-core optical fiber if the alignment error is below a predetermined threshold.

17. An optical fiber alignment system comprising:

a first illumination system configured to illuminate a first singe-core optical fiber;

a second illumination system configured to illuminate a second multi-core optical fiber;

a reflective mirror configured to simultaneously reflect a first illuminated image of the first single-core optical fiber and a second illuminated image of the second multi-core optical fiber, the reflective mirror being configured to move from a first position to a second position, wherein the reflective mirror is disposed between the first single-core optical fiber and the second multi-core optical fiber in the first position, and the reflective mirror is not disposed between the first single-core optical fiber and the second multi-core optical fiber in the second position;

an image capturing system configured to simultaneously receive the reflected first and second illuminated images and to convert the first and second illuminated images into computer-readable image data;

a data processing system configured to receive the image data from the image capturing system and to control movement of at least one of the first single-core optical fiber and the second multi-core optical fiber based upon the image data; and a measurement device configured to measure one or more properties of the first singe-core optical fiber and the second multi-core optical fiber when coupled together, the measurement device being connected to the single-core optical fiber to measure the one or more properties.

* * * * *